(12) United States Patent
Ljung

(10) Patent No.: US 11,240,840 B2
(45) Date of Patent: Feb. 1, 2022

(54) MEDIA ACCESS CONTROL

(71) Applicant: Sony Mobile Communications Inc., Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/483,886

(22) PCT Filed: Feb. 7, 2018

(86) PCT No.: PCT/EP2018/053076
§ 371 (c)(1),
(2) Date: Aug. 6, 2019

(87) PCT Pub. No.: WO2018/146150
PCT Pub. Date: Aug. 16, 2018

(65) Prior Publication Data
US 2020/0022182 A1   Jan. 16, 2020

(30) Foreign Application Priority Data
Feb. 8, 2017 (EP) .................................. 17155177

(51) Int. Cl.
*H04W 4/00* (2018.01)
*H04B 7/212* (2006.01)
*H04B 1/00* (2006.01)
*H04W 74/08* (2009.01)

(52) U.S. Cl.
CPC .............................. *H04W 74/0808* (2013.01)

(58) Field of Classification Search
CPC ................................................ H04W 74/0808

USPC ......................................................... 455/434
See application file for complete search history.

(56) References Cited

U.S. PATENT DOCUMENTS

| 2002/0019214 | A1* | 2/2002 | Brown | H04W 40/00 455/67.11 |
| 2003/0002482 | A1* | 1/2003 | Kubler | G06F 1/1626 370/352 |
| 2003/0072452 | A1* | 4/2003 | Mody | H04L 27/2607 380/274 |

(Continued)

FOREIGN PATENT DOCUMENTS

| WO | 2016012578 A1 | 1/2016 |
| WO | 2017138870 A1 | 8/2017 |
| WO | 2017196329 A1 | 11/2017 |

OTHER PUBLICATIONS

International Search Report and Written Opinion from corresponding International Patent Application No. PCT/EP2018/053076, dated Apr. 18, 2018, 12 pages.

(Continued)

*Primary Examiner* — Mark G. Pannell
(74) *Attorney, Agent, or Firm* — Tucker Ellis LLP

(57) ABSTRACT

The present invention relates to a method comprising monitoring a first value indicative of at least one of a relative occupancy of a wireless channel, and a signal quality of a signal received from a remote communication device (10) via the wireless channel. Furthermore, the method comprises monitoring a second value indicative of a signal level (301) on the wireless channel, and, based on the first value and the second value, selectively initiating a data transmission via the wireless channel.

11 Claims, 4 Drawing Sheets

(56) References Cited

U.S. PATENT DOCUMENTS

| | | | | |
|---|---|---|---|---|
| 2004/0032853 A1* | 2/2004 | D'Amico | ............... | H04L 1/02 370/349 |
| 2004/0052307 A1* | 3/2004 | Godfrey | ............... | H04L 1/0002 375/219 |
| 2005/0249302 A1* | 11/2005 | Leshem | ............... | H04L 1/0618 375/267 |
| 2008/0069038 A1* | 3/2008 | Yamamoto | ........... | H04B 7/0413 370/328 |
| 2009/0005058 A1* | 1/2009 | Kazmi | ............... | H04W 16/10 455/452.1 |
| 2009/0021302 A1* | 1/2009 | Elia | ............... | H03F 1/02 330/127 |
| 2009/0117859 A1* | 5/2009 | Smith | ............... | H04B 7/12 455/78 |
| 2016/0249350 A1 | 8/2016 | Koutsimanis | | |
| 2016/0302230 A1 | 10/2016 | Novlan | | |
| 2019/0036829 A1* | 1/2019 | Ji | ............... | H04W 24/00 |

OTHER PUBLICATIONS

3rd Generation Partnership Project; "Technical Specification Group Radio Access Network; Study on Licensed-Assisted Access to Unlicensed Spectrum (Release 13)" 36889-DOO, Mobile Competence Centre; F-06921, Jun. 30, 2015.

* cited by examiner

MEDIA ACCESS CONTROL

TECHNICAL FIELD

The present invention relates to media access techniques, in particular to Listen Before Talk (LBT) techniques to gain access to a radio-frequency media.

BACKGROUND OF THE INVENTION

The use of mobile communication by means of cellular networks is popular in many industrial areas and areas of daily life. Cellular networks may include for example the Third Generation Partnership Project (3GPP), Long Term Evolution (LTE, sometimes also referred to as 4G), and 3GPP New Radio (NR, sometimes also referred to as 5G) technology. Cellular networks may comprise a plurality of cells with multiple nodes communicating within each cell to each other or with a base station of the cell.

Such cellular communication systems may be combined with the communication on an open spectrum including unlicensed bands. The use of unlicensed bands is for example discussed in the standardisation meetings, see for example 3GPP RP-162159 (3GPP TSG RAN meeting #74, Vienna, Austria, Dec. 5-8, 2016) and RP-162043 (3GPP TSG RAN meeting #74, Vienna, Austria, Dec. 5-8, 2016).

In particular, in 3GPP the use of unlicensed bands for Internet of Things (IoT) solutions are being discussed. For communication on unlicensed bands, the transmission resources are shared among multiple networks, operators, or any node that wants to access the unlicensed band. Therefore, when applying unlicensed band usage to Internet of Things, complexity to accomplish resource allocation for the communication may be added, since a single channel may be shared among any device that wants to access the unlicensed band. Typically, this involves Listen Before Talk (LBT) techniques to ensure that resources for transmission are available on the unlicensed band. It may also include limitations to the maximum allowed channel occupancy per transmission attempts, limiting the time of each transmission after a successful listen before talk channel sensing activity. In case of attempting a transmission but ending up in a collision situation, a back-off technique may be required. According to back-off techniques, a transmission attempt resulting in a collision with one or more further nodes attempting to transmit on the unlicensed band can result in a further retransmission attempt, for example after a random timeout time duration.

For providing a large coverage, coverage enhancement (CE) techniques have been introduced in 3GPP specifications. CE technology may be used in connection with Machine Type Communication (MTC) and the Narrowband IoT (NB-IoT), sometimes also referred to as NB-LTE.

In particular the combination of LBT and CE may raise further problems. With CE each transmission is repeated multiple times in order to improve the aggregated signal-to-noise plus interference ratio (SNIR), and thereby improve the system link budget. By employing CE, a likelihood of successful transmission can be increased even in scenarios of poor conditions of communication on a corresponding wireless link. Thereby, the coverage of networks can be significantly increased, even for low transmission powers as envisioned for the MTC and NB-IoT domain. Different CE levels are used in 3GPP where a repetition level of 10 to 100 is a common value of larger CE levels, and even 2048 repetitions are allowed for the largest CE level. However, techniques of CE may face certain restrictions and drawbacks in combination with transmission on an unlicensed band. For example, CE implementing large counts of repetitions and a highly utilised un-licensed band can result in a significantly increased likelihood of collisions. Further, due to potential limits in the maximum allowed channel occupancy time, several transmission events may be needed in order to transmit the large count of repetitions. This may be due to the long total transmission time required for the large count of repetitions according to the CE. Transmission collisions result typically in back-off and, consequently, further retransmissions. This can increase the latency and may result in increased energy consumption for the transmitting node.

SUMMARY OF THE INVENTION

Therefore, there is a need for advanced techniques for accessing a media or channel to avoid initiating transmissions when the likelihood for many collisions on the media or a channel is large.

This need is met by the features of the appended independent claims. The features of the dependent claims define embodiments.

According to the present invention, a method comprises monitoring a first value. The first value is indicative of at least one of a relative occupancy of a wireless channel, and a signal quality of a signal received from a remote communication device via the wireless channel. The method includes furthermore monitoring a second value indicative of a signal level on the wireless channel. Finally, according to the method, a data transmission via the wireless channel is selectively initiated based on the first value and the second value. In other words, according to the method, two channel sensing requirements need to be fulfilled before a data transmission on the wireless channel is initiated. This may contribute to reduce the likelihood of collisions on the wireless channel when initiating the data transmission.

A computer program product is furthermore provided. The computer program product includes a program code that may be executed by at least one processor. Executing the program code causes the at least one processor to perform the method. The method includes monitoring a first value indicative of at least one of a relative occupancy of a wireless channel, and a signal quality of a signal received from a remote communication device via the wireless channel. The method further includes monitoring a second value indicative of a signal value on the wireless channel, and, based on the first value and the second value, selectively initiating a data transmission via the wireless channel.

A computer program includes program code that may be executed by at least one processor. Executing the program code causes the at least one processor to perform a method. The method includes monitoring a first value indicative of at least one of a relative occupancy of a wireless channel, and a signal quality of a signal received from a remote communication device via the wireless channel. The method includes furthermore monitoring a second value indicative of a signal level on the wireless channel. Based on the first value and the second value, according to the method, a data transmission via the wireless channel is selectively initiated.

According to an embodiment, the first value is monitored during a predefined first time period, and the second value is monitored during a predefined second time period. The predefined second time period is at least partly different from the predefined first time period. In particular, the predefined first time period and the predefined second time period may be completely disjoint. The predefined first time period may be longer than the predefined second time period. Furthermore, the predefined first time period may be arranged prior to the predefined second time period. The monitoring of the second value may selectively be executed based on the monitoring of the first value. For example, the first value may be monitored during the predefined first time period and in case the relative occupancy of the wireless channel is below a predefined threshold and/or the signal quality of the signal received from the remote communication device via the wireless channel is above a predefined threshold, the monitoring of the second value may be initiated. The second value may be monitored during the predefined second time period and the data transmission via the wireless channel may be initiated only in case the signal level on the wireless channel satisfies predefined requirements during the predefined second time period. Thus, at least two requirements have to be fulfilled before gaining access to the wireless channel. Whenever one of the requirements is not fulfilled, the method may restart at the beginning with monitoring the first value.

According to an embodiment, the method comprises furthermore determining a plurality of signal level values on the wireless channel over the predefined first time period, and determining a number of those signal level values of the plurality of signal level values that are above a predefined threshold value. The first value indicative of the relative occupancy is determined based on the number of signal level values above the predefined threshold value and the total number of the predefined plurality of signal level values. Thus, a relative occupancy of the wireless channel may be easily determined, and based on this information the second value may be monitored for gaining access to the wireless channel. The predefined threshold value may have a value in a range of for example 5 to 15%.

According to another embodiment, the method furthermore comprises determining a plurality of signal quality values of subsequent signal transmissions received from the remote communication device via the wireless channel, and determining the first value indicative of the signal quality based on a combination of the plurality of signal quality values. Each signal quality value of the plurality of signal quality values may comprise for example a signal-to-noise ratio of the respective signal transmission of the subsequent signal transmissions, or a received signal strength of a respective signal transmission of the subsequent signal transmissions. Thus, before gaining access to the wireless channel, the received signal strength or quality is evaluated. Each one of the subsequent signal transmissions may comprise at least one reference symbol, for example a so-called beacon or a pilot tone, which may be broadcasted from the remote communication device. The remote communication device may comprise for example a base station of a cell of a wireless communication network, a terminal device or a user equipment device operated in the wireless communication network. Thus, a signal quality of broadcasted signals may be measured and evaluated before attempting to access the wireless channel for data transmission. In this manner, attempts to gain access to the wireless channel during bad channel conditions may be avoided.

The first value indicative of the signal quality may be determined based on a change of the signal quality of the signal received from the remote communication device if compared to historical signal qualities of further signals received from the remote communication device in the past. Thus, a relative or absolute degradation of the received signal quality compared to historical measurements may be determined, and accessing the wireless channel is attempted only in case the current signal quality is above a threshold which is based on historical signal qualities. This may help to avoid to access the wireless channel during poor channel conditions.

The wireless channel may be arranged at least partly in an open spectrum. The open spectrum may comprise unlicensed bands to which a large variety of communication devices are trying to gain access, for example IoT and MTC devices.

According to an embodiment, the data transmission is initiated if the monitored signal level is always below a predefined threshold value during the predefined second time period. Thus, monitoring the second value indicative of a signal level on the wireless channel, may fulfil the same requirements as conventional Listen Before Talk techniques. Additionally, in case during the data transmission a collision is detected, a back off procedure may be included.

According to the invention, a communication device for a wireless communication network comprises at least one transceiver for communicating data via a wireless channel between the communication device and a remote communication device of the wireless communication network, and a control unit. The control unit may comprise a processor configured to execute a program code. The control unit is configured to monitor a first value indicative of at least one of a relative occupancy of the wireless channel, and a signal quality of a signal received from the remote communication device via the wireless channel. The control unit is furthermore configured to monitor a second value indicative of a signal level on the wireless channel, and to selectively initiate a data transmission via the wireless channel based on the first value and the second value.

The communication device may furthermore be configured to perform the embodiments of the above-described method.

Although specific features described in the above summary and the following detailed description are described in connection with specific embodiments and aspects of the present invention, it should be understood that the features of the exemplary embodiments and aspects may be combined with each other unless specifically noted otherwise. Furthermore, the above-described method may be performed by a communication device which comprises a user equipment, an IoT device or an MTC device. The remote communication device may comprise for example a base station of a communication network, in particular a base station of a cellular communication network, an access point, a relay device or another communication device like the user equipment, an IoT device or an MTC device.

BRIEF DESCRIPTION OF THE DRAWINGS

The present invention will now be described in more detail with reference to the accompanying drawings.

DETAILED DESCRIPTION OF EMBODIMENTS

Figure 1:
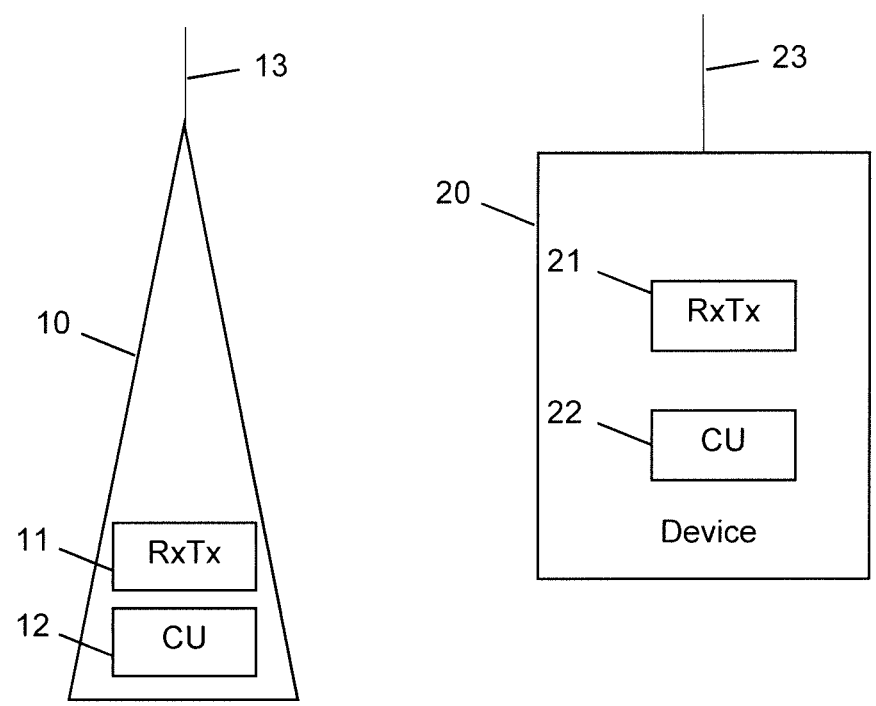
FIG. 1 shows schematically a communication device according to an embodiment of the present invention.

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. A coupling between components may also be established over a wireless connection. Functional blocks may be implemented in hardware, firmware, software or a combination thereof.

The drawings are to be regarded as being schematic representations and elements illustrated in the drawings are not necessarily shown to scale. Rather, the various elements are represented such that their function and general purpose become apparent to a person skilled in the art.

In the following, techniques of transmitting and/or receiving (communicating) encoded data between a first node and a second node of a network are disclosed. The data may correspond, for example, to payload data of applications implemented by the first node and/or the second node. Alternatively or additionally, the data may correspond to control data, for example layer 2 or layer 3 control data according to the Open Systems Interface (OSI) model. The data may comprise uplink (UL) data or downlink (DL) data. The first node may comprise for example a communication device, for example a mobile device, a user equipment (UE), an IOT device, or an MTC device. The second node may comprise for example a base station (BS) or another communication device. Data may be uplink data transmitted from a UE to a BS, and/or data may be downlink data transmitted from a BS to a UE. In other examples, device-to-device (D2D) communication on a sidelink of a wireless link of the network between two UEs could be employed.

The various techniques described herein may be in particular applicable for transmission on unlicensed bands. An unlicensed band may reside in an open spectrum. Multiple operators or networks may share access to the open spectrum. In other words, access to the open spectrum may not be restricted to a single operator or network. Typically, the communication on the open spectrum may involve LBT procedures and/or back off procedures. Such techniques are sometimes also referred to as Carrier Sense Multiple Access/Collision Avoidance (CSMA/CA). Alternatively or in combination with requirements on LBT operation, the communication on the open spectrum may involve a maximum channel occupancy time. The maximum channel occupancy time may restrict a transmitting node to limit a transmission on the open spectrum to a maximum time duration after a successful LBT.

FIG. 1 shows schematically a communication network comprising a base station 10 and a communication device 20. The communication network may comprise a cellular network implementing for example the 3GPP LTE architecture or other types of networks, for example Institute of Electrical and Electronics Engineers (IEEE) 802.11X wireless local area network, Bluetooth or Zigbee.

The communication device 20 may comprise for example a smartphone, a cellular phone, a tablet, a notebook, a computer, a smart TV, an MTC device or an IoT device. An MTC or IoT device is typically a device with a low to moderate requirement on data traffic volumes and loose latency requirements. Communication employing MTC or IoT devices should achieve low complexity and low costs. Energy consumption of an MTC or an IOT device should be comparably low in order to allow battery-powered devices to function for comparably long duration. The communication device 20 may provide communication on unlicensed bands residing in an open spectrum.

The base station 10 may for example implement the evolved UMTS terrestrial radio access technology (E-UTRAN) or may comprise a gateway of a wireless local area network (WLAN). Additionally or as an alternative, the base station 20 may provide communication on unlicensed bands residing in an open spectrum. Thus, a communication between the communication device 20 and the base station 10 on unlicensed bands may be provided.

The base station 10 comprises a transceiver 11 (RxTx), a control unit 12 (CU), and an antenna 13. The communication device 20 comprises a transceiver 21 (RxTx), a control unit 22 (CU), and an antenna 23. In the wireless communication system a plurality of base stations 10 and a plurality of communication devices 20 may be present. Therefore, a plurality of communication devices may try to gain access to wireless communication channels in the unlicensed bands. For avoiding collisions when two or more devices are trying to transmit data simultaneously on the same wireless communication channel, the LBT techniques may be employed.

Figure 2:
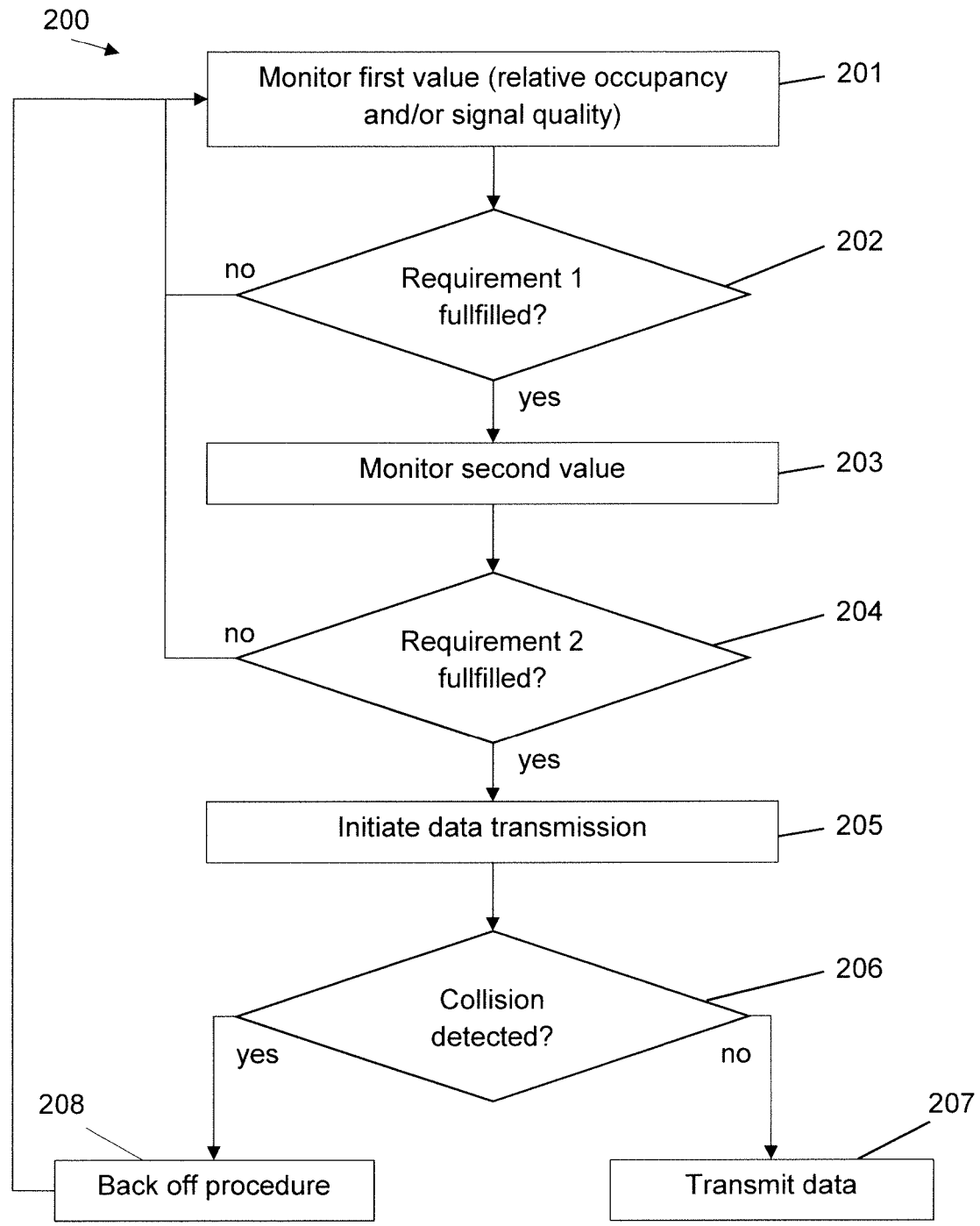
FIG. 2 shows a method comprising method steps according to embodiments of the present invention.

FIG. 2 shows a method 200 for gaining access to a wireless communication channel by listening to signals on the wireless communication channel before transmitting data via the wireless communication channel. Method 200 comprises method steps 201 to 208. Method 200 may be performed for example by the control unit 22 of the device 20.

In step 201 a first value is monitored. The first value may indicate for example a relative occupancy of the wireless communication channel in the unlicensed band.

Figure 3:
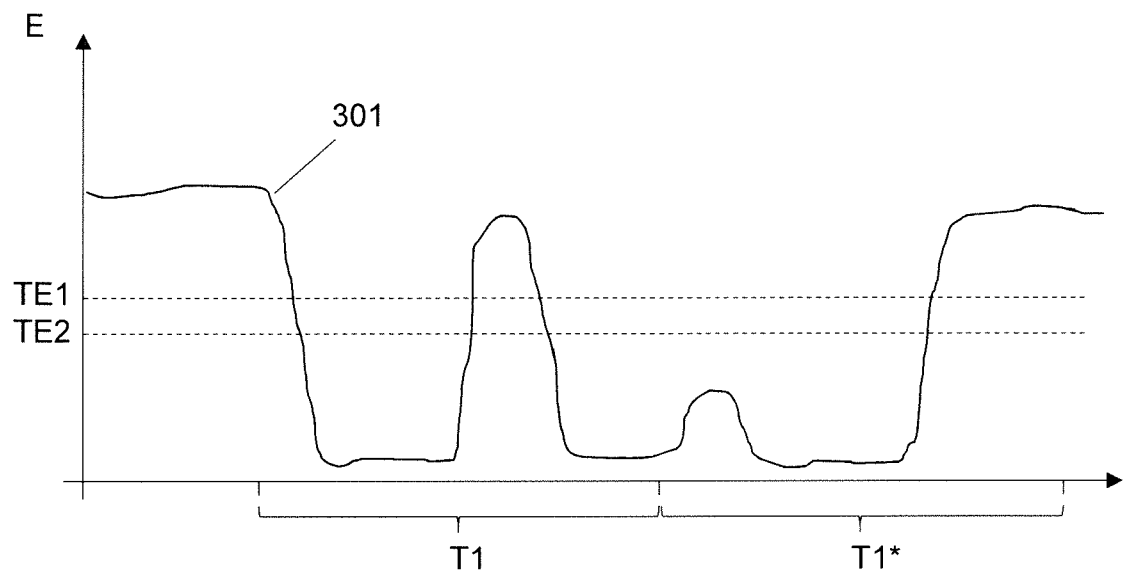
FIGS. 3-6 show monitored values of signals on a wireless channel.

For example, the control unit 22 may analyse a signal in the unlicensed band received via the transceiver 21 and the antenna 23. The signal may comprise a time evolution of the signal level on the wireless communication channel during a predefined first time period. FIG. 3 shows an exemplary signal 301 indicating a time evolution of the signal level, for example a signal energy (E), on the wireless communication channel during the predefined first time period T1. The relative occupancy of the wireless communication channel may be determined by comparing the signal 301 with a first threshold value TE1. Whenever the signal level of signal 301 is above the first threshold value TE1, it is assumed that the wireless communication channel is occupied. Whenever the signal level of signal 301 is below the first threshold value TE1, it is assumed that the wireless communication channel is not occupied. The signal 301 is monitored over the predetermined first time period T1. The time periods during which the signal 301 is above the first threshold value TE1 are accumulated and set into relation to the predetermined first time period T1. This results in a relative occupancy of the wireless communication channel. According to an implementation, the signal level of signal 301 may be sampled in equidistant time steps and the number of samples above the first threshold value TE1 are set into relation to the whole number of samples taken within the first predefined time period T1 to achieve the relative occupancy of the wireless communication channel. The determined relative occupancy may be compared with a predefined occupancy threshold. The predefined occupancy threshold may comprise a value in the range of 5 to 15%. For example, the predefined occupancy threshold may comprise a value of 10%. If the determined relative occupancy is below the predefined occupancy threshold, a "Requirement 1" is considered to be fulfilled in step 202 and the method continues in step 203. In case the determined relative occupancy is not below the predefined occupancy threshold ("Requirement 1" is not fulfilled), the monitored wireless communication channel is considered to be too occupied to start a data transmission at this point of time. Such a scenario as shown in FIG. 3 and therefore in this case the method continues at step 201 to monitor the first value for the predefined first time period again (indicated as T1* in FIG. 3).

It is to be noticed that the signal energy of the signal 301 may comprise a total combined energy as sensed over the used radio spectrum of the wireless communication channel, and that this may comprise the combination of the noise and signal transmissions from any device using the same radio spectrum.

In the example shown in FIG. 4, the "Requirement 1" is fulfilled, as the signal level of signal 301 indicates a relative occupancy below the predefined occupancy threshold of for example 15%. Therefore, in the example of FIG. 4 method 200 is continued in step 203.

In step 203 a second value is monitored. The second value indicates a signal level on the wireless communication channel, for example a signal energy like the exemplary signal 301. The signal level is monitored during a predefined second time period T2, and a "Requirement 2" is fulfilled, when the signal level is always below a predefined second threshold value TE2 during the predefined a second time period T2. The predefined second threshold value TE2 may have a similar or equal value as the predefined first threshold value TE1. The predefined first and second threshold values TE1 and TE2 may have a value which indicate that a valid communication signal is currently communicated on the wireless communication channel.

Figure 4:
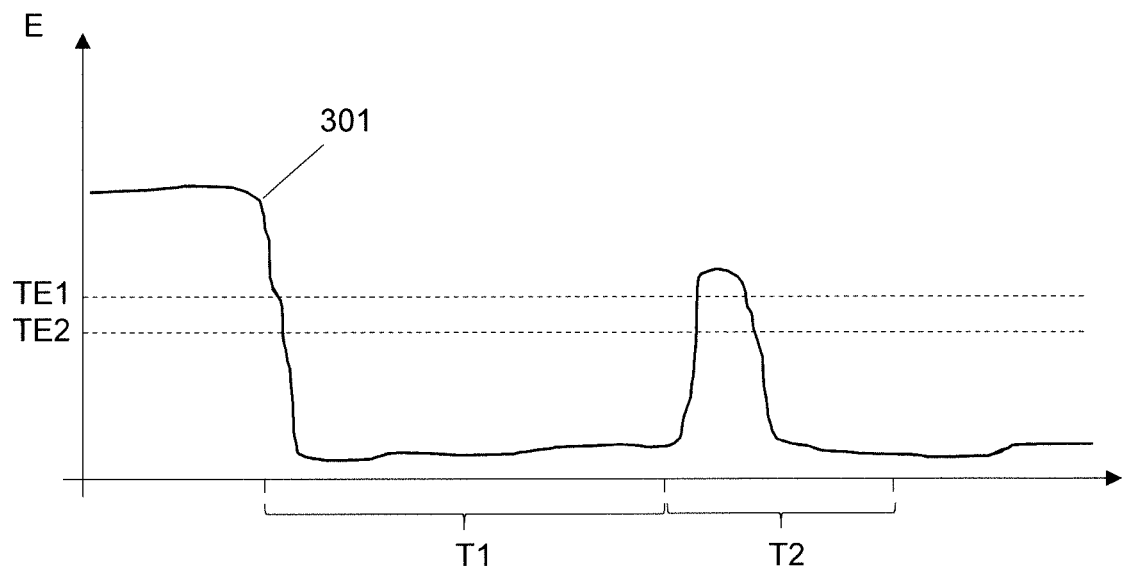
Figure 5:
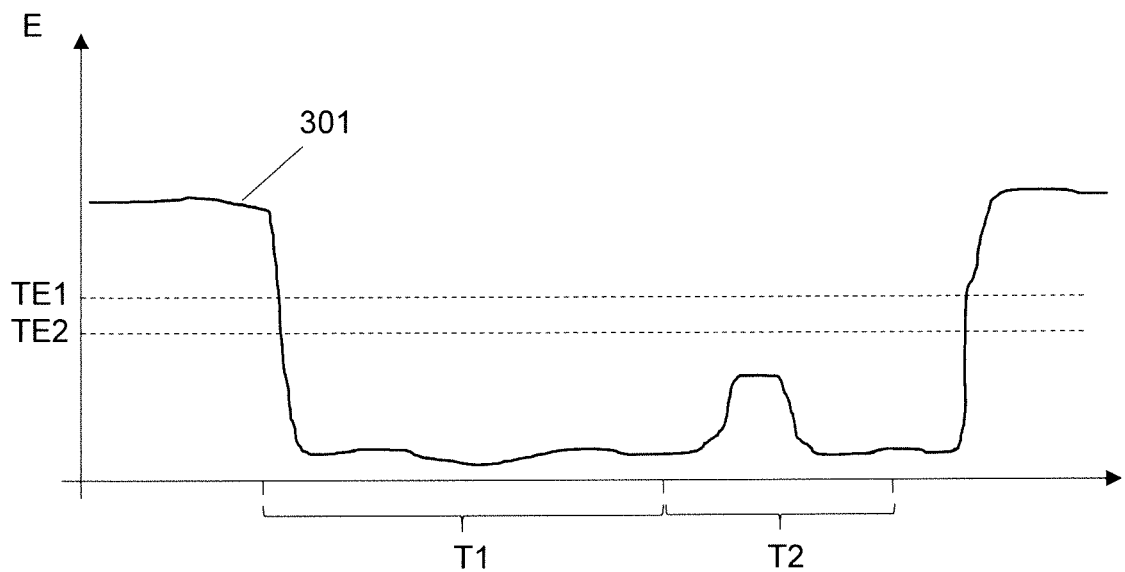

In the example shown in FIG. 4, the "Requirement 2" is not fulfilled as the signal level of signal 301 exceeds the predefined second threshold value TE2 within the predefined second time period T2. Therefore, in the example of FIG. 4, in step 204 of method 200 the "Requirement 2" is not fulfilled and the method is restarted at step 201. However, in the exemplary time evolution of the signal level in FIG. 5, signal 301 is always below the predefined second threshold value TE2 during the predefined second time period T2, and therefore the "Requirement 2" is fulfilled.

When "Requirement 1" and "Requirement 2" are both fulfilled, the method 200 is continued in step 205, where a data transmission on the wireless communication channel is initiated and data may be transmitted. During data transmission the wireless communication channel may be monitored to verify that only the transmitted data is currently transmitted via the wireless communication channel. As long as no collision is detected (step 206), data transmission is continued in step 207. In case a collision is detected (step 206) a back off procedure is initiated in step 208. For example, the processing unit 22 waits for a randomly selected period of time before re-trying to gain access to the wireless communication channel in step 201.

Figure 6:
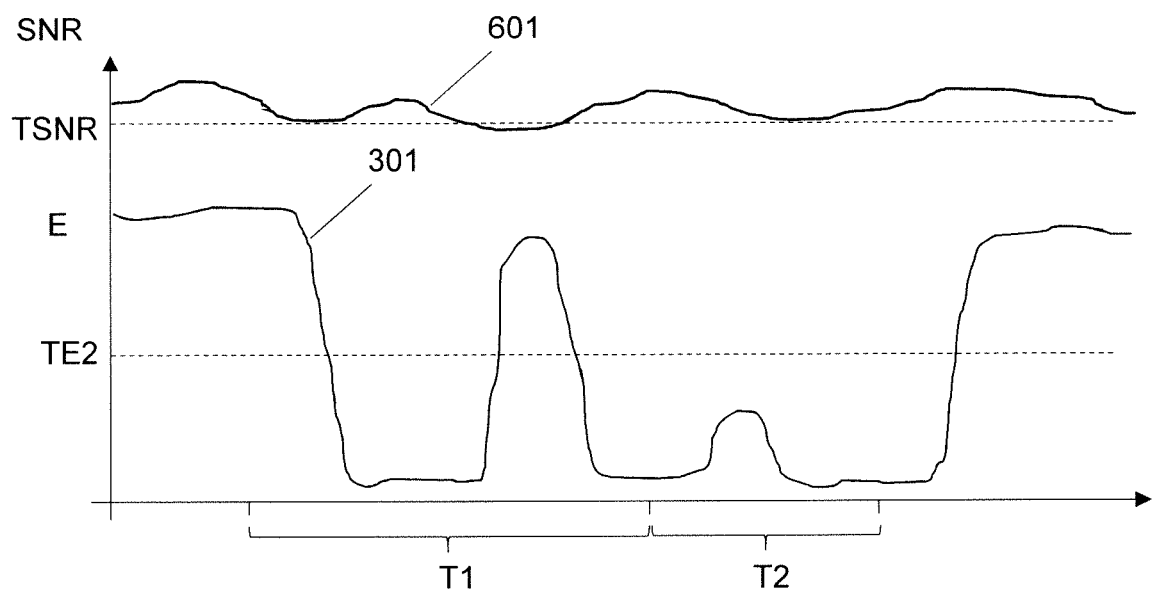

Additionally or as an alternative, in step 201 a first value may be monitored which is indicative of a signal quality of a signal received from a remote communication device via the wireless communication channel. For example, a plurality of signal quality values of subsequent signal transmissions received from the remote communication device via the wireless communication channel may be determined. Each or at least one of the subsequent signal transmissions may comprise payload or control data communicated to another communication device or a reference symbol, for example a beacon. The first value indicative of the signal quality may be determined based on a combination of the plurality of signal quality values. For example, an averaged signal quality value may be determined based on the plurality of signal quality values. The plurality of signal quality values may comprise for example a signal-to-noise ratio of the received signal transmission of the subsequent signal transmissions, or a received signal strength of the received signal transmission of the subsequent signal transmissions. In the example shown in FIG. 6, a plurality of signal quality values 601 is represented which are based on a signal-to-noise ratio (SNR). The plurality of signal quality values 601 may be monitored during a predefined first time period T1, and the first value may comprise a combination of the plurality of signal quality values during the predefined first time period T1, for example by averaging. At the end of the predefined first time period T1 the first value may be compared to a signal-to-noise ratio threshold (TSNR). The signal-to-noise ratio threshold may be determined from historical signal-to-noise ratios determined prior to the predefined first time period T1. In case the first value is above the signal-to-noise ratio threshold, the "Requirement 1" is considered to be fulfilled. In case the first value is below the predefined signal-to-noise ratio threshold, the "Requirement 1" is considered to be not fulfilled. Depending on the comparison of the first value with the predefined signal-to-noise ratio threshold, method 200 is either continued in step 203 ("Requirement 1" fulfilled), or continued in step 201 ("Requirement 1" not fulfilled). The further processing of method 200 starting from step 203 is the same as described above in connection with FIGS. 3-5.

To sum up, according to the method 200 described above, two requirements have to be fulfilled before the communication device 20 starts communicating data on a wireless communication channel in for example unlicensed bands. It is to be noticed that monitoring the second value and determining thereon if the "Requirement 2" is fulfilled corresponds essentially to a Listen Before Talk (LBT) procedure known from for example Ethernet access mechanism CSMA and ensures that the sensor energy level during the sensing period T2 is below the energy detection threshold TE2.

The channel sensing for determining if "Requirement 1" is fulfilled may be realized in different ways and may be performed before determining "Requirement 2". For example, a channel occupancy in time period T1 before the time period T2 may be determined and a current usage state of the wireless communication channel estimated. Typically, T2 may be the same or longer than the T1. It is to be noted that the additional sensing time T1 is a precondition sensing, during which the channel may be very well occupied at certain times, and still result in the decision to proceed towards the LBT procedure and determining if "Requirement 2" is fulfilled.

Additionally or as an alternative, a maximum absolute or relative degradation of the received signal quality compared for example to historical measurements may be considered to determine if "Requirement 1" is fulfilled. For example, an IoT device may be relatively static, meaning that the channel fading is quite slow. A transmission attempt could therefore completely or partially occur and be constrained during a fading dip, which is quite different to a communication device which is moving in for example a vehicle with a fast fading channel that only would impact a few radio frames. The communication device may determine the signal quality of broadcasted signals from a station, for example a base station of a network cell a gateway or an access point. Network requirements may define that the quality in relative or absolute values shall not be worse than a certain historical average before attempting to gain access to the wireless communication channel by the LBT procedure. In this manner, the communication device may avoid to attempt gaining access to the wireless communication channel specifically during bad channel conditions.

It is to be noticed that the channel sensing ("Requirement 1") performed prior to the LBT procedure employ methods may be based on both alternatives above, meaning that the relative signal quality must be above a certain value and that the measured channel occupancy must be below a certain value. These are two implementations of preconditions for initiating LBT, but other types of additional channel sensing requirements may also and/or additionally be applied.

The invention claimed is:

1. A method, comprising:
    monitoring a first value indicative of a relative occupancy of a wireless channel at least partly arranged in an open spectrum, the relative occupancy is determined based on a time evolution of a signal level on the wireless channel during a predefined first time period;
    monitoring a second value that represents a signal energy including a combination of noise added with signal transmissions on the wireless channel at least partly arranged in the open spectrum during a predefined second time period at least partly different from the predefined first time period, and
    determining whether both the first value fulfills a first requirement during the predefined first time period and the second value fulfills a second requirement during the predefined second time period and at a different time than the first value fulfills the first requirement, and
    selectively initiating a data transmission via the wireless channel based on the determination of whether both the first value fulfills the first requirement during the predefined first time period and the second value fulfills the second requirement during the predefined second time period and at a different time than the first value fulfills the first requirement.

2. The method according to claim 1, wherein the predefined first time period is longer than the predefined second time period and/or wherein the predefined first time period is arranged prior to the predefined second time period.

3. The method according to claim 1,
    wherein said monitoring of the second value is selectively executed based on determining that the first value fulfills the first requirement.

4. The method according to claim 1, further comprising:
    determining a plurality of signal level values on the wireless channel over a predefined first time period,
    determining a number of those signal level values of the plurality of signal level values that are above a predefined threshold value, and
    determining the first value indicative of the relative occupancy based on the number of signal level values above the predefined threshold value and a total number of the determined plurality of signal level values.

5. The method according to claim 1, further comprising:
    determining a plurality of signal quality values of subsequent signal transmissions received from the remote communication device via the wireless channel, and
    determining the first value indicative of the signal quality based on a combination of the plurality of signal quality values.

6. The method according to claim 5, wherein each signal quality value of the plurality of signal quality values comprises at least one of:
    a signal to noise ratio of a respective signal transmission of the subsequent signal transmissions, and
    a received signal strength of a respective signal transmission of the subsequent signal transmissions.

7. The method according to claim 5,
    wherein each one of the subsequent signal transmissions comprises at least one reference symbol.

8. The method according to claim 1,
    determining the first value indicative of the signal quality based on a change of the signal quality of the signal received from the remote communication device compared to historical signal qualities of further signals received from the remote communication device.

9. The method according to claim 1,
    wherein the data transmission is initiated if the monitored signal level is always below a predefined threshold value during a predefined second time period.

10. A communication device for a wireless communication network, the communication device comprising:
    at least one transceiver for communicating data via a wireless channel between the communication device and a remote communication device of the wireless communication network, wherein the wireless channel is at least partly arranged in an open spectrum; and
    a control unit configured to
    monitor a first value indicative of a relative occupancy of the wireless channel at least partly arranged in the open spectrum, determined based on a time evolution of a signal level on the wireless channel during a predefined first time period, and
    monitor a second value that represents a signal energy including a combination of noise added with signal transmissions on the wireless channel at least partly arranged in the open spectrum during a predefined second time period at least partly different form the first predefined first time period,
    determine whether both the first value fulfills the first requirement during the predefined first time period and the second value fulfills a second requirement during the predefined second time period and at a different time than the first value fulfills the first requirement, and
    selectively initiate a data transmission via the wireless channel based on the determination of whether both the first value fulfills the first requirement during the predefined first time period and the second value fulfills the second requirement during the predefined second time period and at a different time than the first value fulfills the first requirement.

11. The communication device of claim 10,
    wherein said monitoring of the second value is selectively executed based on determining that the first value fulfills the first requirement.

* * * * *